(12) United States Patent
Dietzel

(10) Patent No.: US 12,528,423 B2
(45) Date of Patent: Jan. 20, 2026

(54) INDICATOR DEVICE IN A MOTOR VEHICLE

(71) Applicant: Brose Fahrzeugteile SE & Co. Kommanditgesellschaft, Coburg, Coburg (DE)

(72) Inventor: Renee Dietzel, Coburg (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 0 days.

(21) Appl. No.: 18/687,165

(22) PCT Filed: Aug. 24, 2022

(86) PCT No.: PCT/EP2022/073541
§ 371 (c)(1),
(2) Date: Feb. 27, 2024

(87) PCT Pub. No.: WO2023/025831
PCT Pub. Date: Mar. 2, 2023

(65) Prior Publication Data
US 2024/0424998 A1 Dec. 26, 2024

(30) Foreign Application Priority Data
Aug. 27, 2021 (DE) ............ 10 2021 122 206.0

(51) Int. Cl.
*B60R 11/02* (2006.01)
*B60K 35/10* (2024.01)
(Continued)

(52) U.S. Cl.
CPC .......... *B60R 11/0235* (2013.01); *B60K 35/10* (2024.01); *B60K 35/22* (2024.01);
(Continued)

(58) Field of Classification Search
CPC ........ B60K 35/10; B60K 35/22; B60K 35/53; B60R 11/0223; B60R 11/0235;
(Continued)

(56) References Cited

U.S. PATENT DOCUMENTS 9,132,788 B2   9/2015  Karsch et al.
9,278,648 B2   3/2016  Ackeret et al.
(Continued)

FOREIGN PATENT DOCUMENTS

DE       19749365       4/2008
DE     102011090045     7/2013
(Continued)

OTHER PUBLICATIONS

"International Search Report and Written Opinion," for PCT Patent Application No. PCT/EP2022/073541 mailed Dec. 7, 2022 (11 pages).

*Primary Examiner* — Nathnael Aynalem
(74) *Attorney, Agent, or Firm* — Pauly, DeVries Smith & Deffner LLC

(57) ABSTRACT

Various embodiments relate to a display device in a motor vehicle, in particular arranged on a dashboard, having an adjustable display and an adjustment mechanism assigned to the display, wherein the display is adjustable between a parked position and at least one functional position. It is proposed that the adjustment mechanism has a locking arrangement which can be moved from a locking state, in which the locking arrangement exerts a holding force on the adjustment mechanism for holding the display in the parked position and/or the functional position, and possibly also in an intermediate position, into a release state, in which the locking arrangement does not exert a holding force, or exerts a reduced holding force, on the adjustment mechanism, that the display is manually adjustable, and that the locking (Continued)

arrangement can be transferred into the release state in a motorized manner.

7 Claims, 2 Drawing Sheets

(51) Int. Cl.
  *B60K 35/22* (2024.01)
  *B60K 35/53* (2024.01)
  *B60R 11/00* (2006.01)
(52) U.S. Cl.
  CPC ....... *B60K 35/53* (2024.01); *B60R 2011/0005* (2013.01); *B60R 2011/0082* (2013.01); *B60R 2011/0092* (2013.01)
(58) Field of Classification Search
  CPC ..... B60R 2011/0005; B60R 2011/0082; B60R 2011/0085; B60R 2011/0092; B60R 2011/0007; B60R 2011/0084; G09G 2380/10

USPC .................................................. 348/837, 348
  See application file for complete search history.

(56) References Cited

U.S. PATENT DOCUMENTS 12,145,512 B2 * 11/2024 Voigt ..................... B60K 35/50
2011/0063530 A1 * 3/2011 Karsch .................. B60K 35/10
    348/837

FOREIGN PATENT DOCUMENTS

| DE | 102013013694 | 12/2014 |
| DE | 102019109839 | 10/2020 |
| WO | 03059678 | 7/2003 |
| WO | 2020207530 | 10/2020 |
| WO | 2023025831 | 3/2023 |

* cited by examiner

INDICATOR DEVICE IN A MOTOR VEHICLE

CROSS-REFERENCE TO RELATED APPLICATIONS

This application is a national stage application under 35 U.S.C. 371 of International Patent Application Serial No. PCT/EP2022/073541, entitled "INDICATOR DEVICE IN A MOTOR VEHICLE," filed Aug. 24, 2022, which claims priority from German Patent Application No. DE 10 2021 122 206.0, filed Aug. 27, 2021, the disclosure of which is incorporated herein by reference.

FIELD OF THE TECHNOLOGY

Various embodiments relate to a display device in a motor vehicle.

BACKGROUND

The known prior art (WO 2009 062 720 A1), on which some embodiments are based, relates to a display device in a motor vehicle.

The display device in question is used in the context of displaying any information in a motor vehicle. This includes the display of navigation information, of vehicle state information or of audio information. The display device often serves not only for display, but also for the input of information. For this purpose, there can be provision that additional operator-control elements are provided on the display device. In various cases, the display device also takes the form of a touchscreen for inputting information.

A display device has an adjustable display and an adjustment mechanism assigned to the display. The display is adjustable in a motorized manner from a parked position, in which the display is not in use, into at least one functional position.

It is a challenge here to adjust the display, in a structurally optimally simple manner, into a functional position in which a user obtains an individually adapted optimal view of the display. By virtue of the motorized drive, the functional position is either universally preset, or it is particularly complicated to control the motorized drive in such a way that the functional position is specifically adapted to the individual requirements of the user.

SUMMARY

The problem on which some embodiments are based is that of configuring and developing the known display device in such a way that, with regard to the aforementioned challenge, a further optimization is achieved.

The above problem is solved by at least some of the features described herein.

Various embodiments provide a manually adjustable display, which in particular does not have an adjustment drive, that is to say a drive for moving the display, with a locking arrangement which can be transferred in a motorized manner from a locking state, in which it holds the display in the parked position and/or the respective functional position, into a release state, in which it allows the manual adjustment. The user can in a simple manner manually transfer the display into a functional position which is individually advantageous for him or her and in which an optimal view of the display is made possible. The display is then securely held in the functional position such that a further unwanted adjustment of the display is prevented. Here, the motorized transfer of the locking arrangement into its release state facilitates the manual adjustment of the display. Specifically, the display can thus be transferred in a simple and very accurate manner into a functional position individually adapted to the user, since the user does not have to adjust the display against the force of the locking arrangement.

It is specifically proposed that the adjustment mechanism has a locking arrangement which can be moved from a locking state, in which the locking arrangement exerts a holding force on the adjustment mechanism for holding the display in the parked position and/or the functional position, into a release state, in which the locking arrangement does not exert a holding force, or exerts a reduced holding force, on the adjustment mechanism, that the display is manually adjustable, and that the locking arrangement can be transferred into the release state in a motorized manner.

Various embodiments provide a display device in a motor vehicle, in particular arranged on a dashboard, having an adjustable display and an adjustment mechanism assigned to the display, wherein the display is adjustable between a parked position and at least one functional position, wherein the adjustment mechanism has a locking arrangement which can be moved from a locking state, in which the locking arrangement exerts a holding force on the adjustment mechanism for holding the display in the parked position and/or the functional position, into a release state, in which the locking arrangement does not exert a holding force, or exerts a reduced holding force, on the adjustment mechanism, wherein the display is manually adjustable, and wherein the locking arrangement can be transferred into the release position in a motorized manner.

In various embodiments, the display device has an electric drive motor which is or can be coupled in terms of drive to the locking arrangement via a flexible force transmission element, and in that the locking arrangement can be transferred into the locking state by actuating the drive motor.

In various embodiments, the locking arrangement has a locking element which can be moved from a locking position, in which the locking element is in holding frictional and/or form-fitting engagement with a component of the adjustment mechanism, into a release position, in which the locking element does not exert a holding force, or exerts a reduced holding force, on the component of the adjustment mechanism.

In various embodiments, the adjustment mechanism has a resetting device which, in particular by means of a resetting spring, produces a resetting force and thus holds the locking arrangement in the locking state, and in that the locking arrangement can be moved into the release state against the resetting force of the resetting device. In some embodiments, the drive motor can be driven in reverse by the resetting device until the locking arrangement is in the locking state.

In various embodiments, the display device has a release element, in particular arranged on the display, in that the release element can be manually actuated, and in that, by actuating the release element, the motorized transfer of the locking arrangement into the release state is brought about.

BRIEF DESCRIPTION OF THE DRAWINGS

Various aspects will be explained in more detail below with reference to a drawing which merely illustrates exemplary embodiments. In the drawing.

DETAILED DESCRIPTION

Figure 1:
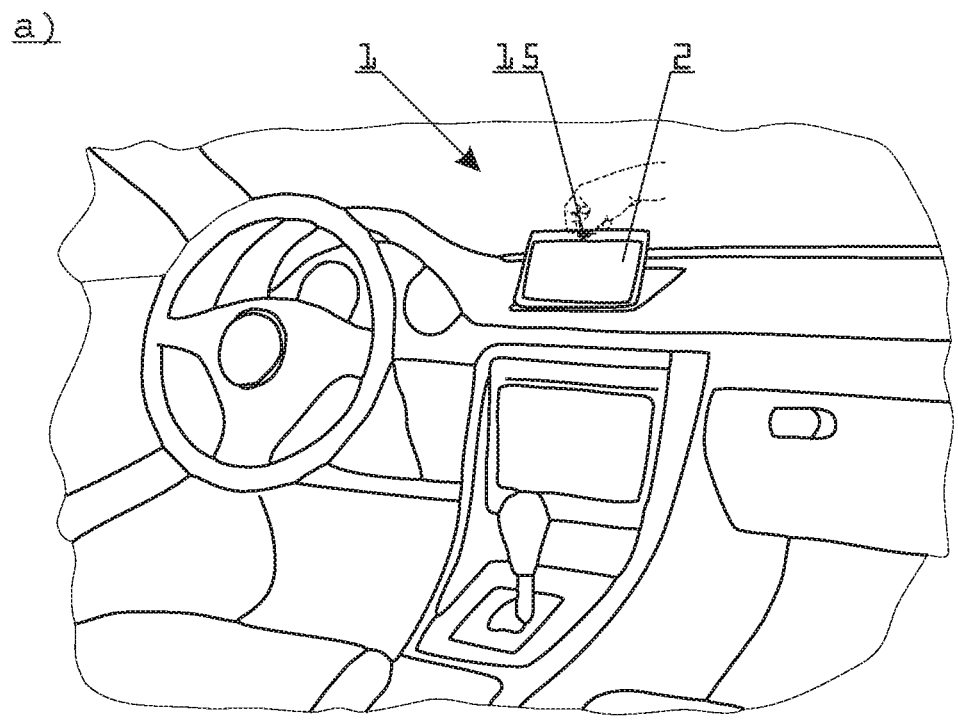
FIG. 1 shows a proposed display device in a) a perspective view and b) a schematic side view.
Figure 1:
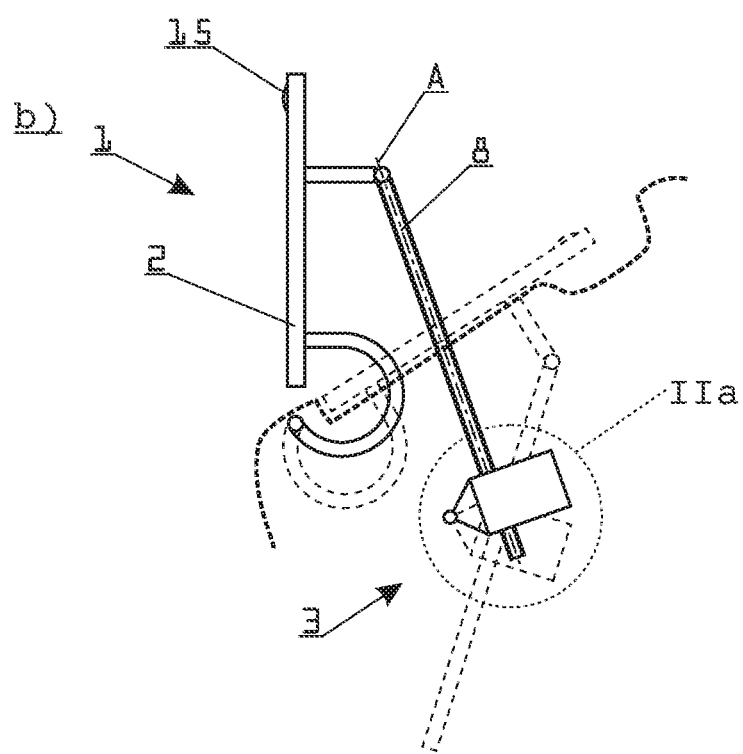

The drawing shows a proposed display device 1 in a motor vehicle, which display device is arranged on a dashboard, as is shown in FIG. 1a). It is alternatively also possible to arrange the display device 1 elsewhere in the motor vehicle, for example on a vehicle seat, an interior trim, an interior console or the like. The display device 1 has an adjustable display 2. For this purpose, the display 2 is assigned an adjustment mechanism 3 which allows the display 2 to be adjusted between a parked position and at least one functional position. In FIG. 1b), the functional position is represented in solid lines and the parked position in dashed lines. There can be provision that the display 2 can be moved into a plurality of functional positions. The display 2 can be adjusted in a stepped and/or stepless manner.

What is meant by the term "parked position" is that the display is positioned in such a way that a user cannot read information from the display 2 or at any rate cannot do so comfortably. This position is intended for when the display 2 is not in use. What is meant by the term "functional position" is that the display 2 is positioned in such a way that a user can comfortably read information from the display 2. This position or these positions is or are intended for when the display 2 is used as intended. In particular, the term "functional position" means any position which does not correspond to the "parked position".

Here, the display 2 is adjustable out of the parked position in at least one direction of movement. It is particularly advantageous here if the display 2 is adjustable out of the parked position in a plurality of directions of movement and in particular is also designed to be pivotable in order to transfer the display 2 into a functional position individually adapted to the user. For this purpose, the adjustment mechanism 3 can have a plurality of joints in order to allow a high degree of freedom when adjusting the display 2.

The exemplary embodiment which is illustrated in the figures, relates to a display device 1 in a motor vehicle, in particular arranged on a dashboard, having an adjustable display 2 and an adjustment mechanism 3 assigned to the display 2, wherein the display 2 is adjustable between a parked position and at least one functional position.

It is essential then that the adjustment mechanism 3 has a locking arrangement 4 which can be moved from a locking state, in which the locking arrangement 4 exerts a holding force on the adjustment mechanism 3 for holding the display 2 in the parked position and/or the functional position, into a release state, in which the locking arrangement 4 does not exert a holding force, or exerts a reduced holding force, on the adjustment mechanism 3, that the display 2 is manually adjustable, and that the locking arrangement 4 can be transferred into the release state in a motorized manner.

The locking arrangement 4 can be moved from a locking state into a release state. In the locking state, the locking arrangement 4 exerts a holding force on the adjustment mechanism 3 for holding the display 2 in the parked position and/or the functional position. The display 2 is then reliably secured against an adjustment in the respective parked or functional position. The holding action here comprises in particular a frictional holding action (frictional engagement), in which case the locking arrangement 4 forms a braking arrangement and the holding force is a braking force, or a form-fitting holding action (form-fitting engagement), in which case the locking arrangement 4 forms a latching connection. By contrast, in the release state, the locking arrangement 4 does not exert a holding force, or exerts a reduced holding force, on the adjustment mechanism 3 in order to allow the adjustment of the display 2.

The manual adjustability of the display 2 has the effect that the functional position of the display 2 can be adapted to the individual circumstances by the user in a simple manner. For this purpose, the display 2 must only be moved manually by the user into the corresponding functional position. Here, the simple adjustment of the display 2 is additionally improved by virtue of the fact that the locking arrangement 4 can be transferred into its release state in a motorized manner. When adjusting the display 2, the user thus does not have to overcome the holding force of the locking arrangement, as a result of which the adjustment of the display 2 is made possible in a particularly simple manner.

Figure 2:
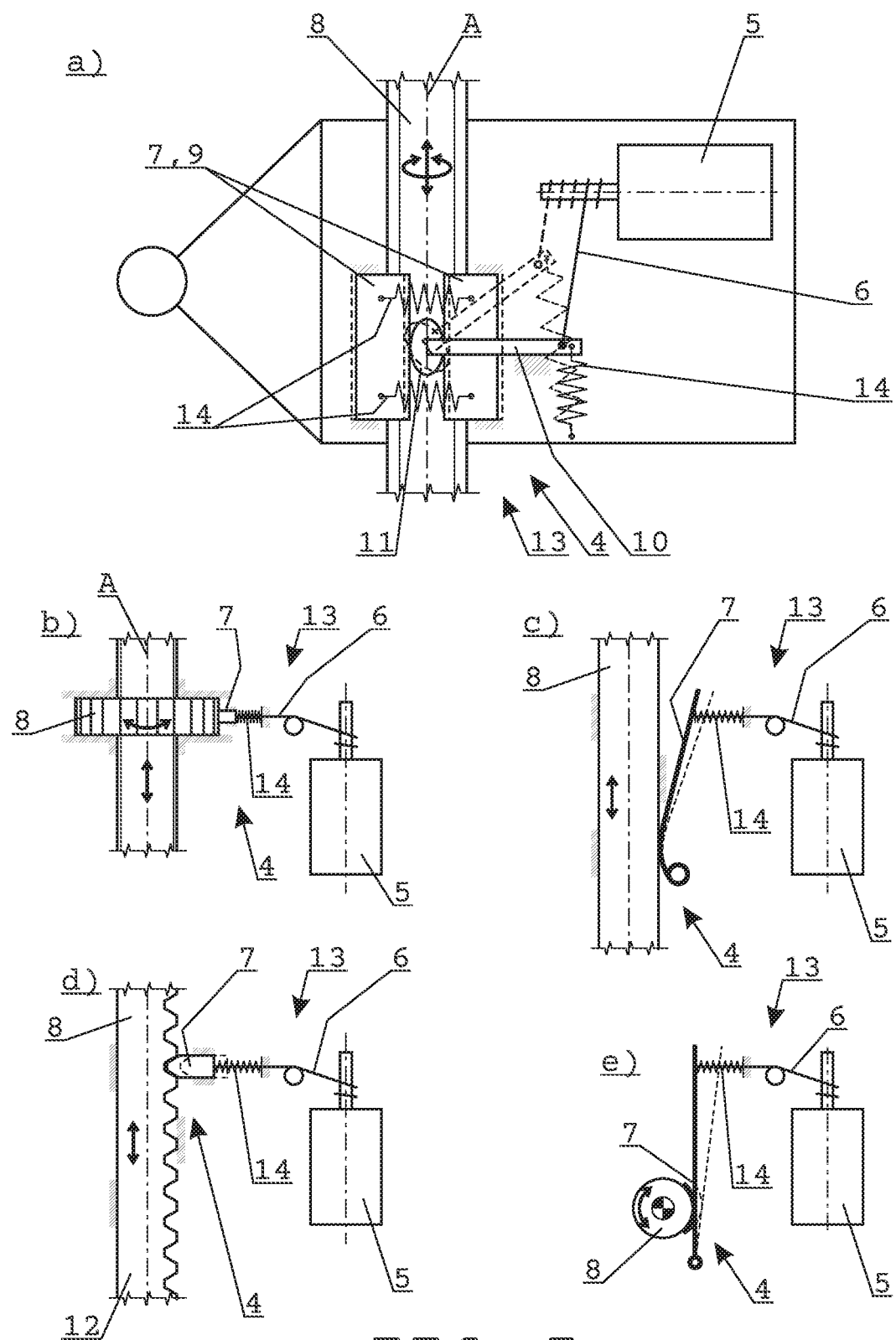
FIG. 2 shows a schematic side view of the locking arrangement in a) a first embodiment, b) a second embodiment, c) a third embodiment and d) a fourth embodiment.

In the exemplary embodiment illustrated in FIG. 2, there can be further provision here that the display device 1 has an electric drive motor 4 which is or can be coupled in terms of drive to the locking arrangement 4 via a flexible force transmission element, and that the locking arrangement 4 can be transferred into the release state by actuating the drive motor 5.

What is meant by the term "flexible force transmission element" in the present case is a cable, a belt, a yarn, a thread, a chain, an elastic wire or the like made of any desired material, in particular plastic and/or metal. In this respect, the term "flexible force transmission element" is to be interpreted broadly.

The coupling of the locking arrangement 4 to the drive motor 5 via the flexible force transmission element 6 allows a simple and cost-effective configuration of the mechanism for transferring the locking arrangement 4 into its release state.

The locking arrangement 4 is transferred into its release state by actuating the drive motor 5. In FIG. 2, the release state is in each case represented in dashed lines. The locking state is shown in solid lines. Here, the drive movement of the drive motor 5 is transmitted to the locking arrangement 4 via the flexible force transmission element 6. By using a flexible force transmission element 6, such as a metal or plastic cable, changes of direction of the force from the place of introduction to the locking arrangement 4 are possible in a simple manner. Accordingly, the display device 1 can be constructed to be particularly flexible. It is possible to provide the force introduction by the drive motor 5 at any desired point on or away from the locking arrangement 4. It is possible in this way not only for the structural flexibility to be increased but also for the installation space requirement of the display device 1 to be reduced. Moreover, cost savings can be achieved as a result of both aforementioned advantages.

There can be provision here according to FIG. 2 in this exemplary embodiment that the locking arrangement 4 has a locking element 7 which can be moved from a locking position, in which the locking element 7 is in holding frictional and/or form-fitting engagement with a movable component 8 of the adjustment mechanism 3, into a release position, in which the locking element 7 does not exert a holding force, or exerts a reduced holding force, on the component 8 of the adjustment mechanism 3.

What is meant by a "movable component 8 of the adjustment mechanism 3" is a part which moves concomitantly during a manual adjustment of the display 2. In particular, the component 8 also has a function of supporting the display 2.

FIG. 2a) to FIG. 2d) illustrate different embodiments of the locking arrangement 4. The coupling of the locking element 7 to the drive motor 5 via the flexible force transmission element 6 allows simple and cost-effective transfer of the locking element 7 into its release position.

In FIG. 2a), the locking element 7, in the locking position, is in holding frictional engagement with the movable component 8 of the adjustment mechanism 3. In FIG. 2a), the component 8 can be a linearly and rotatably movable spindle. The locking element 7 consists here of two brake shoes 9 which have a braking action on the spindle in a radial direction to a geometric spindle axis A of said spindle. When actuating the drive motor 5, a force produced by the drive motor 5 is transmitted to a pivotable lever 10 via the flexible force transmission element 6. The lever 10 is connected to an elliptical transmission element 11 which, by pivoting the lever 10, is rotated in such a way that the brake shoes 9 are moved radially away from the spindle, with the result that the holding force on the spindle is reduced or completely cancelled. Alternatively to a spindle, a threadless rod can also be provided here.

In the embodiment according to FIG. 2b) there is provided an exclusively linearly movable spindle which is supported by a rotatable spindle nut as movable component 8 along the geometric spindle axis A. In the locking position, the locking element 7 is in holding form-fitting engagement or frictional engagement with the spindle nut.

In FIG. 2c) and FIG. 2e), the flexible force transmission element 6 is directly coupled to the locking element 7. In the locking position, the locking element 7 is in holding frictional engagement with the movable component 8. Here, the locking element 7 is pivotable or elastically deformable. An introduction of force into the flexible force transmission element 6 causes the locking element 7 to be pivoted or reversibly deformed in such a way that the holding force is reduced or completely cancelled. The movable component 8 can be designed to carry out a linear movement (FIG. 2c)) or a rotary movement (FIG. 2e)).

In FIG. 2d), the flexible force transmission element 6 is likewise directly coupled to the locking element 7. However, in the locking position, the locking element 7 is here in holding form-fitting engagement with the linearly movable component 8. For this purpose, the component 8 has a toothing 12 and, in the locking position, the locking element 7 is arranged between two adjacent teeth of the toothing 12. In the release position, the locking element 7 is, in many instances, not in engagement with the toothing 12.

There can be provision here according to FIG. 2 in this exemplary embodiment that the adjustment mechanism 3 has a resetting device 13 which, in particular by means of a resetting spring 14, produces a resetting force and thus holds the locking arrangement 4 in the locking state, and that the locking arrangement 4 can be moved into the release state against the resetting force of the resetting device 13. In various embodiments, the drive motor 5 can be driven in reverse until the locking arrangement 4 is in the locking state.

The locking arrangement 4 is held in the locking state by the resetting device 13. This is advantageous since the locking action is thus maintained precisely even when the drive motor 5 is not supplied with current and/or is not actuated. The locking arrangement 4 must then be transferred into its release state by the drive motor 5 against the resetting force in order to allow an adjustment of the display 2. Once the desired functional position has been reached, if the drive motor 5 is not supplied with current and/or is not actuated, the resetting force of the resetting device 13 can cause the locking arrangement 4 to be transferred into the locking state, as a result of which simple and cost-effective resetting is achieved. At the same time, the drive motor 5 can be reversed by the resetting force. The drive motor 5 must thus be driven only in one direction, as a result of which the complexity of the circuitry is reduced.

The locking arrangement 4 can in particular also be configured as an overload coupling. If, for example in the event of misuse, a force which exceeds a defined threshold value is introduced into the display 2, the locking arrangement 4 can pass into the release state and/or the holding force can be reduced.

In the exemplary embodiment illustrated in FIG. 1 and FIG. 2, there can be further provision here that the display device 1 has a release element 15, in particular arranged on the display 2, that the release element 15 can be manually actuated, and that, by actuating the release element 15, the motorized transfer of the locking arrangement 4 into the release state is brought about.

In order to be able to adjust the display 2, a user, as is shown in FIG. 1, can grip the display 2 and at the same time actuate the release element 15. By virtue of the actuation, the locking arrangement 4 is then transferred into the release state in a motorized manner, as a result of which the display 2 can be adjusted in a simple manner. It is advantageous here if the release element 15 is actuated by a user gripping the display 2. The release element 15 can be a mechanical element, such as, for example, a button, a bar, a lever or the like. Alternatively, it is also possible that the release element 15 is embodied in an electrical manner or as a sensor. Thus, for example, a sensor of the display 2 can detect that a user is gripping the display 2, as a result of which the locking arrangement 4 is transferred into the release state. Alternatively or additionally, touching a switching surface of the display 2 can also lead to the locking arrangement 4 being transferred into the release state. It is thus ensured a simple manner that the locking arrangement 4 is transferred into the release state exclusively when a user wishes to adjust the display 2.

The invention claimed is:

1. A display device in a motor vehicle, comprising an adjustable display, a drive motor, and an adjustment mechanism assigned to the display, wherein the display is adjustable between a parked position and at least one functional position,
    wherein the adjustment mechanism has a locking arrangement which is configured to be transferred between a locking state and a release state by the drive motor,
    wherein in the locking state the locking arrangement exerts a holding force on the adjustment mechanism for holding the display in the parked position and/or the functional position, and in the release state the locking arrangement exerts a reduced holding force compared to the locking state on the adjustment mechanism,
    wherein the display is manually adjustable, and
    wherein the device is configured such that the drive motor does not adjust the display between the parked position and the at least one functional position while transferring the locking arrangement into the release position.

2. The display device according to claim 1, wherein the drive motor has an electric drive motor which is or can be coupled in terms of drive to the locking arrangement via a flexible force transmission element, and wherein the locking arrangement can be transferred into the locking state by actuating the drive motor.

3. The display device according to claim 1, wherein the locking arrangement has a locking element which can be moved from a locking position, in which the locking element is in holding frictional and/or form-fitting engagement with a component of the adjustment mechanism, into a release position, in which the locking element does not exert a holding force, or exerts a reduced holding force, on the component of the adjustment mechanism.

4. The display device according to claim 1, wherein the adjustment mechanism has a resetting device which produces a resetting force and thus holds the locking arrangement in the locking state, and wherein the locking arrangement can be moved into the release state against the resetting force of the resetting device.

5. The display device according to claim 1, wherein the display device has a release element, wherein the release element can be manually actuated, and in that, by actuating the release element, the motorized transfer of the locking arrangement into the release state is brought about.

6. The display device according to claim 4, wherein drive motor can be driven in reverse by the resetting device until the locking arrangement is in the locking state.

7. The display device according to claim 5, wherein the release element is arranged on the display.

* * * * *